March 15, 1927.
V. A. ZIEGLER
BAKING PAN
Filed Nov. 21, 1925
1,620,710
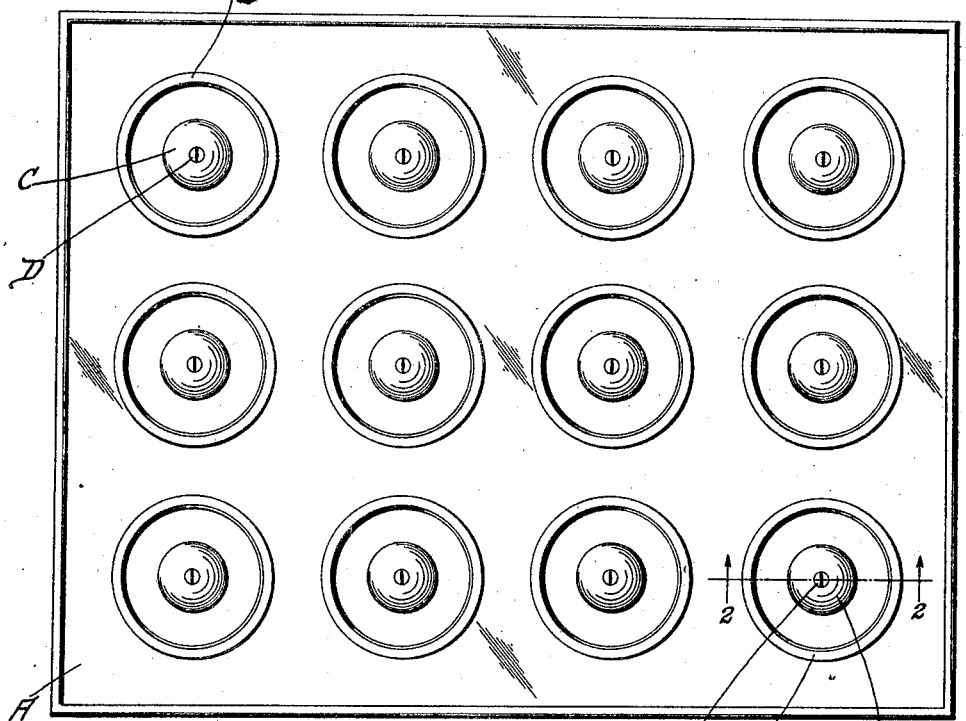
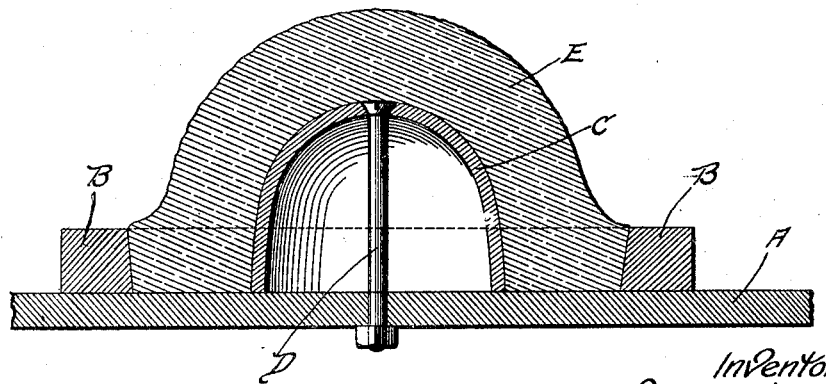

Patented Mar. 15, 1927.

1,620,710

UNITED STATES PATENT OFFICE.

VIRGIL A. ZIEGLER, OF ST. LOUIS, MISSOURI.

BAKING PAN.

Application filed November 21, 1925. Serial No. 70,559.

My invention relates to baking pans and more particularly to baking pans for making pastry shells such as are used in making various confections, including tarts, puffs, and the like, where a filling of whipped cream, ice cream, or jam is placed in the hollow interior of the shell.

Heretofore making these shells has involved an extremely difficult and costing procedure. It has been the practice to make a solid cake and then to take out the dough in the center of the cake so as to leave a hollow depression. This, of course, was very costly because it took a comparatively great length of time to hollow out the interior of the cake and, in addition, the portion of the cake removed had to be thrown away and therefore was wasted. Some attempts have been made to provide a baking pan or a baking board with which these pastry shells could be baked but these appliances have not been commercially successful because the pastry shells would not be baked thoroughly and evenly and, furthermore, because they were difficult to handle and would not properly shape the pastry. For this reason the manufacture of confections in which cake or bread pastry shells have been used has been very restricted as the shells have been manufactured in the old way and at a high cost which, necessarily, made for such a high retail sale price as to greatly limit the market.

The object of my invention is to provide a baking pan for baking pastry shells of dough which pan will quickly and cheaply produce a pastry shell of uniform texture and of any desired shape.

A baking pan embodying one form of my invention is fully shown in the accompanying drawings wherein similar letters are used to designate similar parts: Fig. 1 is a top view of the baking pan and Fig. 2 is a section along the lines 2—2 in Fig. 1 with a pastry shell in place on the form.

Referring to the figures the baking pan shown therein and which embodies one form of my invention has a back member A. On this back member A are a plurality of knobs C which are preferably secured to the back member by means of a bolt D passing through the top of the knob and through a hole in the back member A, as shown in detail in Fig. 2, but which may be arranged on the back member by any other suitable means. I prefer that the knobs C are hollow and that those portions of the back member A which are under the knobs are imperforate, as shown, for reasons more fully hereinafter set forth. The back member A also has thereon a plurality of retaining rims B preferably of substantially circular shape but which may follow any contour. Each one of the retaining rings B is arranged around and spaced from one of the knobs C, as shown in Fig. 1. In the embodiment of my invention shown the knobs C are substantially hemispherical in shape and, therefore, the sides thereof incline inwardly from the vertical toward the center of the knobs. Also, the inner surface of each of the retaining rims B flares upwardly and outwardly away from the knob it surrounds, as shown in the drawings, for the purpose hereinafter set forth.

To obtain the best results and to make a more even and thorough baking of the dough from which the pastry shells are made I prefer that all of the parts of my new and improved baking pan be of metal or other heat conducting material so that the heat of the oven in which the baking pan is placed will be transmitted to all parts of the pan. This transmission of the heat will be aided in the preferred form of my device wherein, as described above, the knobs are secured to the back member and hence have a positive connection therewith. The retaining rims B may be fastened onto the back member A by welding, or in any other suitable way.

The method of using my device is as follows: In baking pastry shells a dough of comparatively great consistency is used and after the parts of the baking pan which contact with the dough are greased the dough is placed over each of the knobs C of the baking pan. The retaining rims B limit the outward movement of the dough away from the knobs C at the bottom thereof and give a uniform shape to the pastry shells to be produced. After all of the knobs C are covered with dough the baking pan is placed in the oven and the dough is baked the required length of time. Since, as described above, those portions of the back member which are positioned under the knobs are preferably imperforate a dead air space is formed under each knob and any heating of the air in this space and any heating of the knobs themselves is by transmission through the metal parts of the device and, consequently, while enough heat is transmitted to thoroughly bake the dough throughout the shell no hard crust is formed on the inside of the shell as would be the case if the inside were directly exposed to the heat of the oven. After the baking is completed the baking pan is removed from the oven and over each of the knobs C will have been made a pastry shell such as designated as E in Fig. 2. The pastry shells E are then either lifted off the knobs C or the pan is inverted and the pastry shells E are allowed to drop off the knobs. Since, as described above, the sides of each of the knobs C incline inwardly from the vertical, when a pastry shell is lifted off one of the knobs or is allowed to drop from the pan if the pan is inverted the movement of the shell will not be parallel to the sides of the knob and it will be lifted out of contact with the knob and the sides of the knob will not drag on or move along the sides or any part of the inner surface of the hollow interior of the shell and, therefore, the inner surface of the shell will be maintained intact. Also, since the inner surface of the retaining rim is flared outwardly the edge of the pastry shell will not drag along this inner surface and will not be broken. I prefer that the retaining rims B be of materially less height than the knobs C so that a pastry shell of substantially the shape shown in Fig. 2 will be produced.

It is obviously not my intention to limit my invention to the exact details of construction included in the embodiment thereof shown in the drawings and described in the specification herein as the shape and arrangement of the parts may be varied within wide limits without deviating from the spirit of my invention.

What I claim as new and desire to secure by Letters Patent, is:—

1. A baking pan for pastry shells comprising a substantially flat metal back member, a plurality of hollow metal knobs extending outwardly from the upper surface of said back member and having a substantially air tight joint therewith, and those portions of said back member positioned under said knobs being imperforate whereby a dead air space is formed under each of said knobs.

2. A baking pan for pastry shells comprising a back member, a plurality of hollow knobs secured to the upper surface of said back member, said back member and said knobs being formed of a heat conducting material and those portions of said back member positioned under said knobs being imperforate, and said back member and said knobs being arranged whereby a dead air space is formed under each of said knobs.

3. A baking pan for pastry shells comprising a back member, a plurality of hollow metal knobs secured to and projecting outwardly from the upper surface of said back member, and a plurality of retaining rims, each of said rims being positioned around and being spaced from one of said knobs, those portions of said back member positioned under said knobs being imperforate, said retaining rims being of materially less height than said knobs.

In witness whereof I have signed my name to this specification.

VIRGIL A. ZIEGLER.